US007945438B2

(12) United States Patent
Balmelli et al.

(10) Patent No.: US 7,945,438 B2
(45) Date of Patent: May 17, 2011

(54) AUTOMATED GLOSSARY CREATION

(75) Inventors: Laurent Balmelli, Tokyo (JP); Roy Byrd, Ossining, NY (US); Mitchell A. Cohen, Yorktown Heights, NY (US); Sai Zeng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/695,225

(22) Filed: Apr. 2, 2007

(65) Prior Publication Data
US 2008/0243488 A1 Oct. 2, 2008

(51) Int. Cl.
G06F 17/27 (2006.01)
G06F 17/21 (2006.01)
G06F 17/30 (2006.01)
G06F 7/00 (2006.01)

(52) U.S. Cl. .............. 704/10; 704/9; 707/708; 707/738; 707/741

(58) Field of Classification Search ............ 704/1, 9–10; 707/2, 6, 100–101
See application file for complete search history.

(56) References Cited

U.S. PATENT DOCUMENTS

| | | | | |
|---|---|---|---|---|
| 5,331,556 A | * | 7/1994 | Black et al. | 704/9 |
| 5,708,829 A | * | 1/1998 | Kadashevich et al. | 715/236 |
| 5,832,480 A | * | 11/1998 | Byrd et al. | 707/5 |
| 5,937,422 A | * | 8/1999 | Nelson et al. | 715/206 |
| 6,094,652 A | * | 7/2000 | Faisal | 707/5 |
| 6,182,029 B1 | * | 1/2001 | Friedman | 704/9 |
| 6,901,402 B1 | * | 5/2005 | Corston-Oliver et al. | 707/101 |
| 6,965,857 B1 | * | 11/2005 | Decary | 704/9 |
| 7,523,102 B2 | * | 4/2009 | Bjarnestam et al. | 1/1 |
| 2004/0078190 A1 | * | 4/2004 | Fass et al. | 704/7 |
| 2005/0154690 A1 | * | 7/2005 | Nitta et al. | 706/46 |
| 2005/0278164 A1 | * | 12/2005 | Hudson et al. | 704/4 |

OTHER PUBLICATIONS

Bernstein. "Querying the semantic web with Ginseng: A guided input natural language search engine". In: 15th Workshop on Information Technologies and Systems, Las Vegas, NV, Dec. 2005, pp. 45-50.*
Girju et al. "Learning Semantic Constraints for the Automatic Discovery of Part-Whole Relations". Proc. of HLT-2003, 2004, pp. 1-8.*
You et al, "Automatic Semantic Role Assignment for a Tree Structure." The Third SIGHAN Workshop on Chinese Language Processing, Jul. 2004, pp. 1-7.*
Chen, et al., "Ranking-based Business Information Processing," *IBM T.J. Watson Research Center*, pp. 1-9.

* cited by examiner

*Primary Examiner* — Matthew J Sked
(74) *Attorney, Agent, or Firm* — Stephen Bongini; Fleit Gibbons Gutman Bongini & Bianco PL

(57) ABSTRACT

A method and device for creating a glossary includes a processor operable for executing computer instructions for identifying, in at least one information source, at least one glossary item identifying a part or a component, determining at least one glossary item form as a canonical form, defining, by using the canonical form, at least one syntactic structure, that includes one of the at least one identified glossary items, for each of at least one semantic classes, and searching a second information source for the at least one syntactic structure of the semantic class.

30 Claims, 9 Drawing Sheets

AUTOMATED GLOSSARY CREATION

FIELD OF THE INVENTION

The present invention relates to glossaries, and more particularly relates to automatically creating glossaries by utilizing rules to identify which words are likely to be parts of phrases.

BACKGROUND OF THE INVENTION

Electronic data is available from a myriad of sources. The data can be structured, as is the case with coded fields and timestamps, or unstructured, as found in free-form open language text fields (such as those often labeled "comments" or "description").

Rule-based systems, data mining systems, data analytics systems, and many other systems work on structured data. However, there is important information in unstructured data, and processing and analysis of this information can provide great business value. To enable this processing and analysis, the unstructured data needs to be converted into the structured type of data on which these systems work.

A glossary is a collection of specialized terms or phrases and their meanings. Many methodologies for processing text documents and fields are based on using such glossaries. For example, one use for glossaries is in processing (and performing text analytics on) post-sales product data and failures, such as warranty claims and field service reports. The glossaries are used to pull out symptoms, causes, actions, and components from failure reports.

In many instances, the size of a glossary can be extremely large. For instance, in the area of automotive warranty claims, a car has several thousand parts and each part typically has several types of failures. Further, failures can be caused by interdependencies between different parts. While this creates a very large number of entries, this number significantly increases when one considers variation in language to describe these failures. This is due to the fact that there are many ways to say the same thing, even in perfectly written English. Factoring in typographical errors, improper grammar, abbreviations, and other factors adds further complexity.

It is impractical for a human to manually create all of the possible variations of each canonical form, let alone create all the possible canonical forms. There are procedures that assist in manual creation, by partially automating some of the glossary creation process. FIG. 1 shows a sample flow for a manual glossary creation process that includes initial automated phrase extraction. The flow begins with the creation of variations at the simple word level. Then, phrase variations that correspond to one specified phrase are automatically built. However, with such a process human intervention is necessary, at least for glossary administration and for rule administration. So while these tools aid in glossary creation, too much human effort is still necessary to justify the text analytics.

SUMMARY OF THE INVENTION

The present invention provides a method for creating a glossary, which includes the steps of identifying, in at least one information source, at least one glossary item identifying a part or a component, determining at least one glossary item form as a canonical form, defining, by using the canonical form, at least one syntactic structure, that includes one of the at least one identified glossary items, for each of at least one semantic classes, and searching an information source for the syntactic structure of the semantic class.

In accordance with another feature, the present invention includes determining at least one glossary item form as a variant form, then defining, by using the variant form, at least one syntactic structure, that includes one of the at least one identified glossary items, for each of at least one semantic classes, and finally, searching an information source for the at least one variant form of the syntactic structure of the semantic class.

In accordance with a further feature of the present invention, the semantic class is at least one of a symptom, a cause, and an action.

In accordance with an additional feature of the present invention, the determining is performed by mapping variant glossary item forms onto canonical forms.

In accordance with an added feature of the present invention, the defining is performed by parsing to identify the at least one syntactic structure typical of a semantic class.

In accordance with yet another feature, the present invention includes defining, by using the canonical form of the glossary item, at least one syntactic structure, that does not include one of the at least one identified glossary items, for each of at least one semantic classes.

The present invention also provides a device for creating a glossary, which includes a processor operable for executing computer instructions for identifying at least one glossary item in a first information source, determining at least one glossary item form as a canonical form, defining, by using the canonical form, at least one syntactic structure, that includes one of the at least one identified glossary items, for each of at least one semantic classes, and searching a second information source for the at least one syntactic structure of the semantic class.

In accordance with an added feature, the processor is further operable to execute computer instructions for determining at least one glossary item form as a variant form and defining, by using the variant form, at least one syntactic structure, that includes one of the at least one identified glossary items, for each of at least one semantic classes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
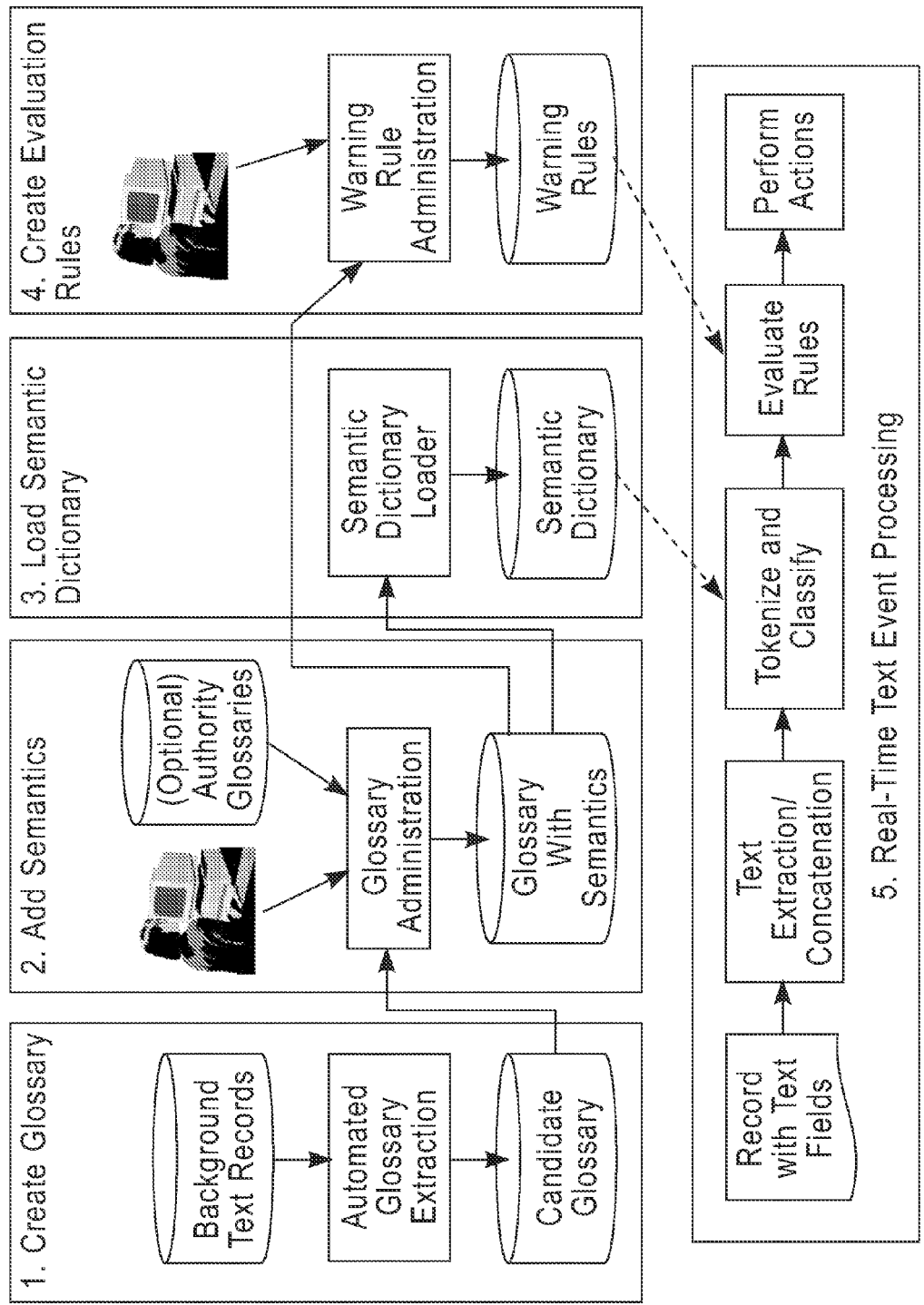
FIG. 1 illustrates a sample flow for a manual glossary creation process that includes initial automated phrase extraction.

While the specification concludes with claims defining the features of the present invention that are regarded as novel, it is believed that the present invention will be better understood from a consideration of the following description in conjunction with the drawing figures, in which like reference numerals are carried forward.

Preferred embodiments of the present invention provide an apparatus and method for automatically creating glossaries that can then be used to extract detailed information (such as symptoms, causes, actions, and other valuable information) from specialized resources (such as warranty claims, field reports, call center records, and customer surveys). This detailed information can then be used for early warning detection as well as data mining, including trend analysis and failure prediction.

One exemplary application for an embodiment of the present invention is in analyzing failure reports, and in particular, failure reports that also include information about the repair. Failure reports can take many forms including warranty claims, call center records, field engineer service reports, and others. These failure reports typically contain structured fields (such as product identification, repair date, and repair costs), as well as coded fields (such as those that describe the failure and symptom at a high level). Additionally, there typically exists an unstructured text field for a comment or description. Repair technicians typically type up the reported problem (i.e., the symptom), what they found (i.e., the cause), and what they did to fix the problem (i.e., the repair action) in these unstructured text fields. There may be other useful information in the text fields such as the problem and replaced parts, diagnostic actions, and test actions. While analyzing failure reports is an exemplary application, the present invention can be used in many applications and is in no way limited to only those examples described herein.

Figure 2:
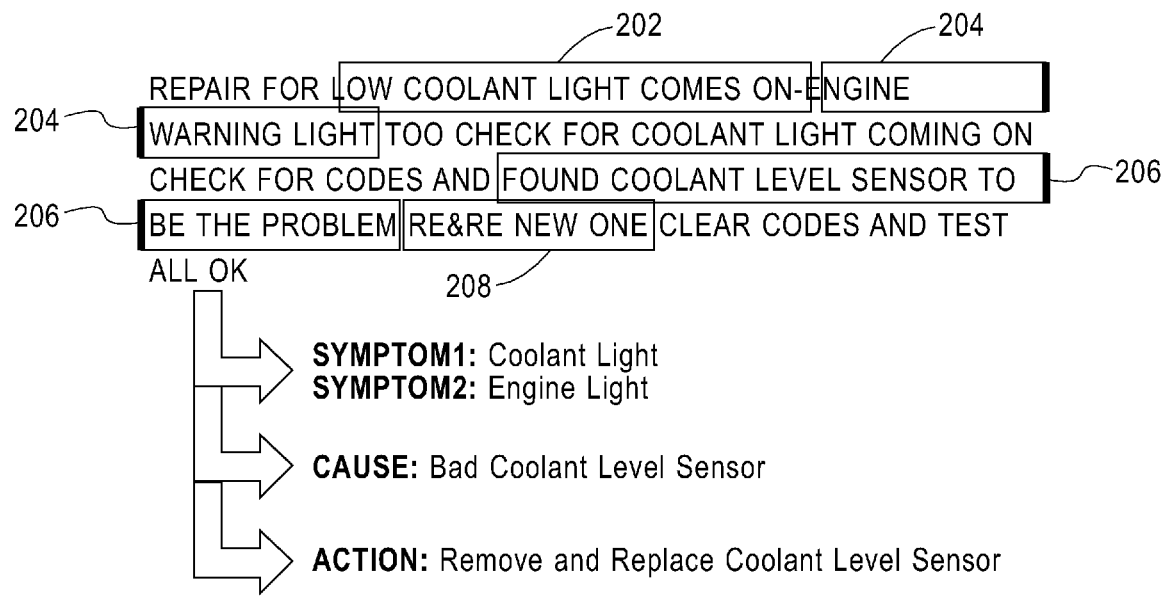
FIG. 2 illustrates a typical text entry into an unstructured field.

FIG. 2 shows an example of a typical text entry into an unstructured field of a failure report. Unstructured fields allow the data enterer to type into the designated area without restriction as to terms or order of words. Glossary-based methodologies enable analyzing these technician comments. For instance, boxes 202 and 204 frame two symptoms (coolant light and engine light, respectively), box 206 frames a cause (bad coolant level sensor), and box 208 frames an action (remove and replace coolant level sensor). In this example, it is assumed that all of this information was entered into the unstructured text field by a technician.

While symptoms, causes, and actions are often represented in coded fields of the failure reports, these are typically only high-level codes that do not contain the same richness of information that appears in the text of the comments placed in the unstructured fields. Embodiments of the present invention use text analytics on the comments in an unstructured text field to convert this rich information into structured information.

The simplest glossary-based technique is to look for occurrences of words and phrases. For instance, algorithms are used to derive the noun to which a pronoun refers. To apply this technique, incoming failure reports are scanned for occurrences of the phrases contained in the glossary with the goal of pulling out one or more symptoms, causes, and actions. Then, analytics are applied to those (structurally) tagged failure reports.

Figure 3:
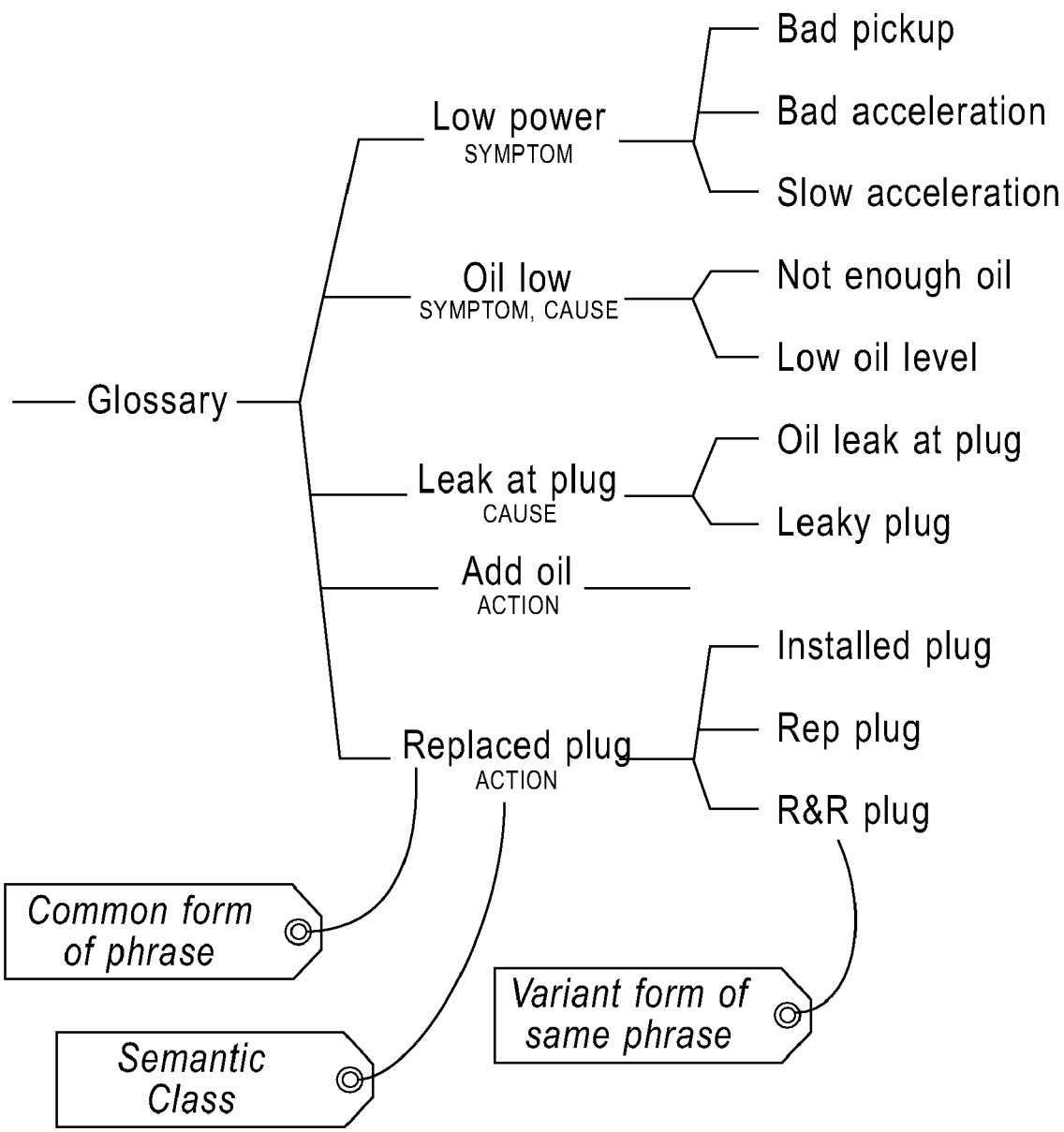
FIG. 3 shows a portion of a sample subset of a glossary in accordance with an embodiment of the present invention.

A portion of a sample subset of a glossary is shown in FIG. 3. In the exemplary embodiment shown, variations of phrases with similar meanings are grouped together with the most commonly occurring phrase within the group being used as the canonical form. Each of these groups is represented by its canonical form and is labeled with one or more semantic classes. The semantic classes, in this particular example, are symptom, cause, and action. In another embodiment of the present invention, the semantic classes are separated into sub-classes. For instance, action can be separated into three separate sub-classes: diagnostic action, repair action, and test action.

After failure reports, or other data sources, are tagged with their occurrences, analytics are applied based on the number of occurrences of each type of symptom, cause, and action, and each occurrence's attributes such as failure time, failure location, and other coded fields. This exemplary embodiment of the present invention uses the Systems Modeling Language (SysML), a standard language for describing systems and complex products, for modeling systems, describing elements of the system, and the relationships between these elements. The language has a visual counterpart and is supported by modeling environments such as the Rational Software Architect.

Figure 4:
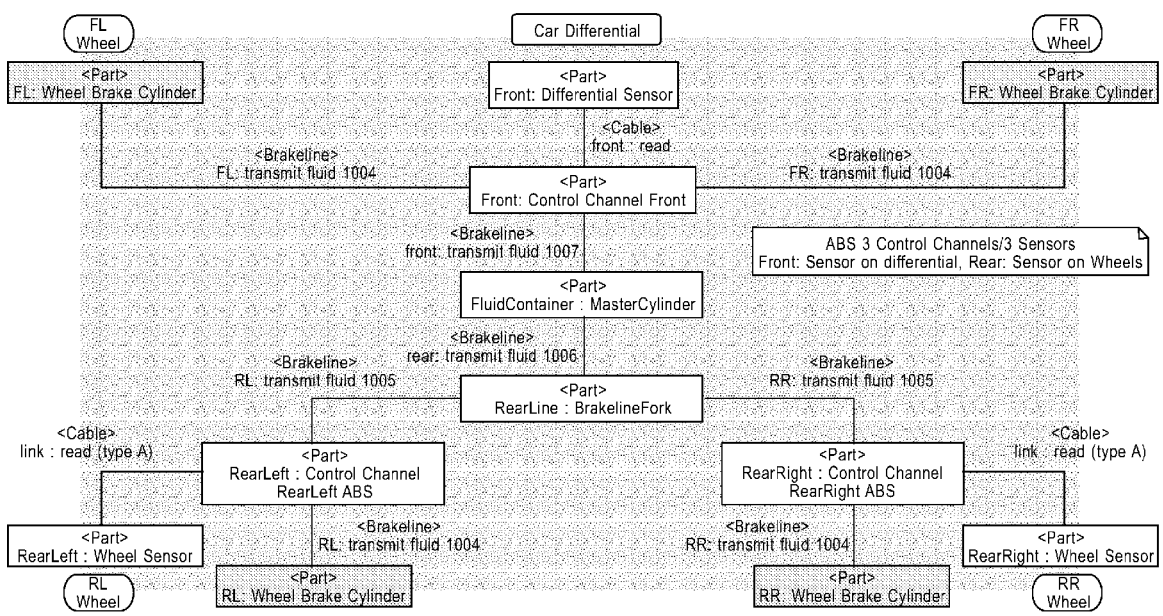
FIG. 4 is a Systems Modeling Language (SysML) representation of a sample system according to one embodiment of the present invention.

FIG. 4 shows a sample system represented through the use of SysML according to an exemplary embodiment of the present invention. The sample system shown in FIG. 4 is a conceptual representation of an anti-lock brake system for an automobile. A set of parts forming the system (such as the control channel, sensors, etc.) and their connections (such as through brake lines and electric wiring) are represented. Additional shapes (i.e., wheels, car body, differential, etc.) are represented for illustration purposes. System engineers model the systems they create using similar models to coordinate the design of the product with other teams. From the text version of the SysML model that is displayed graphically, parts and components of the system can be extracted.

Figure 5:
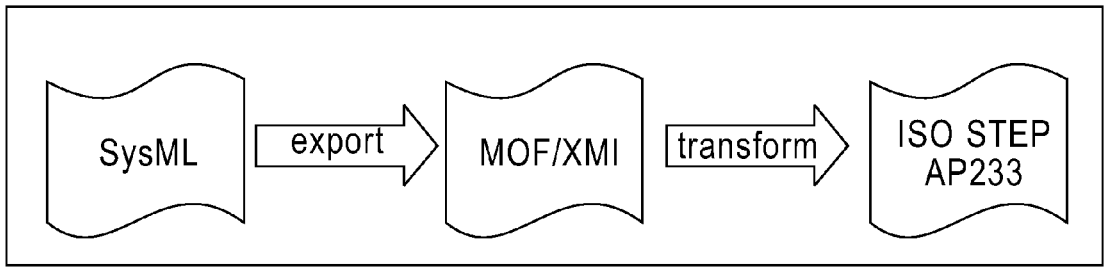
FIG. 5 is a flow diagram of a process for converting SysML to ISO AP233 in accordance with an embodiment of the present invention.

FIG. 5 shows a process for converting a SysML representation into an ISO AP233 format in accordance with an embodiment of the present invention. The exemplary system model shown in FIG. 4 is a system model as would be displayed on a graphical user interface that is used to create and modify the model. The SysML format that is used to create the model is very similar to Unified Modeling Language (UML) (i.e., SysML includes much of UML with some other additions). As shown in FIG. 5, the SysML system model is converted in this embodiment through an export into Extensible Markup Language (XML) Metadata Interchange format (XMI, a form of XML), as is commonly done with UML. The XMI format data is then transformed into another XML format (for example, ISO STEP AP233) that can then be easily parsed to pull out components.

For example, a sample portion of ISO STEP AP233 XML data is the following.

```
<ap233:Part id="MasterCylinder">
    <Id>505051</Id>
    <Name>Master Cylinder</Name>
    <Description> Master Cylinder of the Fluid Container</Description>
</ap233:Part>
```

In this sample data, the contents of the "Name" tag (i.e., "Master Cylinder") identified within a "Part" tag can be extracted. From this simple extraction, a part called "Master Cylinder" is identified. In further embodiments, other methods are used to perform the extraction of data from the system model, such as the use of the XML Path Language (XPath), for example with the XPath expression "//ap233:Part/@id". It should be noted that the invention is not limited to any particular programming language(s).

Figure 6:
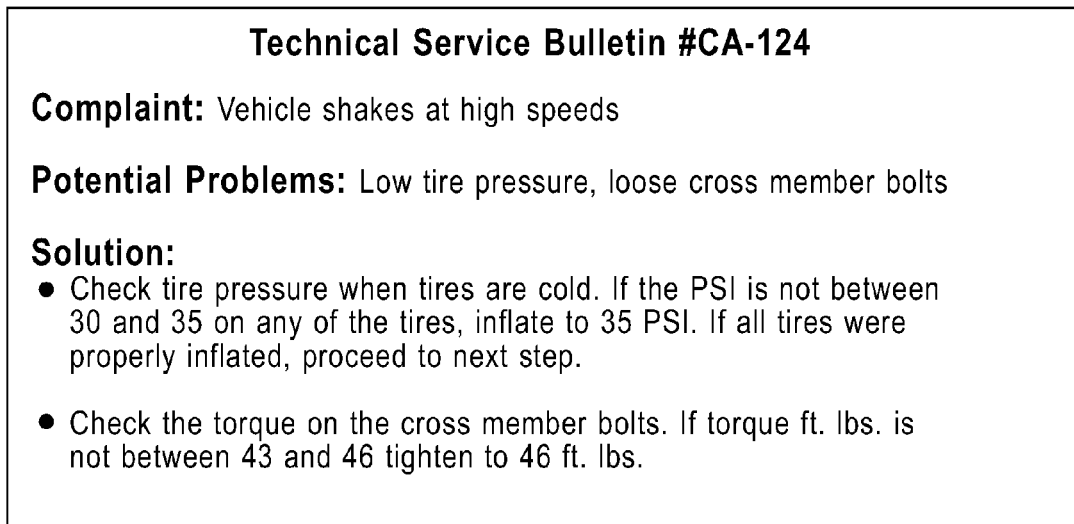
FIG. 6 is a block diagram of a sample source-specific adapter for a formatted text document according to an embodiment of the present invention.
Figure 6:
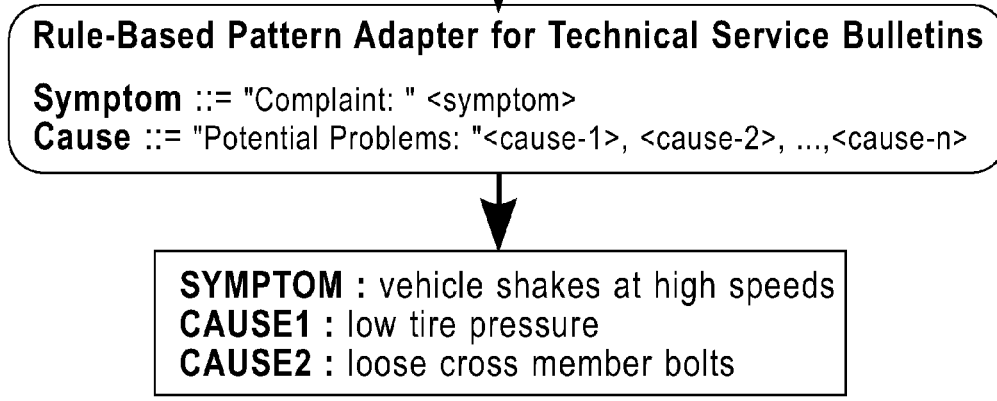

Besides structured sources such as the SysML model of FIG. 4, useful information can also be extracted from semi-structured sources and many types of unstructured text sources according to certain embodiments of the present invention. As an example, FIG. 6 shows a sample source-specific adapter for a semi-structured source. The semi-structured source is a consistently-formatted text document. Consistently-formatted document sources provide a structure to enable semantic parsing of text. For instance, the Technical Service Bulletin shown in FIG. 6 has:

1) a complaint statement labeled "Complaint";
2) a possible cause labeled "Potential Problems"; and
3) a set of diagnostic and corrective actions in list format labeled "Solution".

From this formatted text document, rules can be devised to make a source-specific pattern adapter for the Technical Service Bulletin. An automated process is then able to use the rules to parse the text document and extract useful information. For example, one rule is that the "Complaint" statement defines a symptom. Using this rule, when the automated process finds the pattern "Complaint" in the text document, a symptom is then extracted. Further rules can similarly be used to extract causes and actions from the "Potential Problems" and "Solution" sections of the Technical Services Bulletin. Thus, the rules form a pattern adapter for this specifically formatted text data source.

Figure 7:
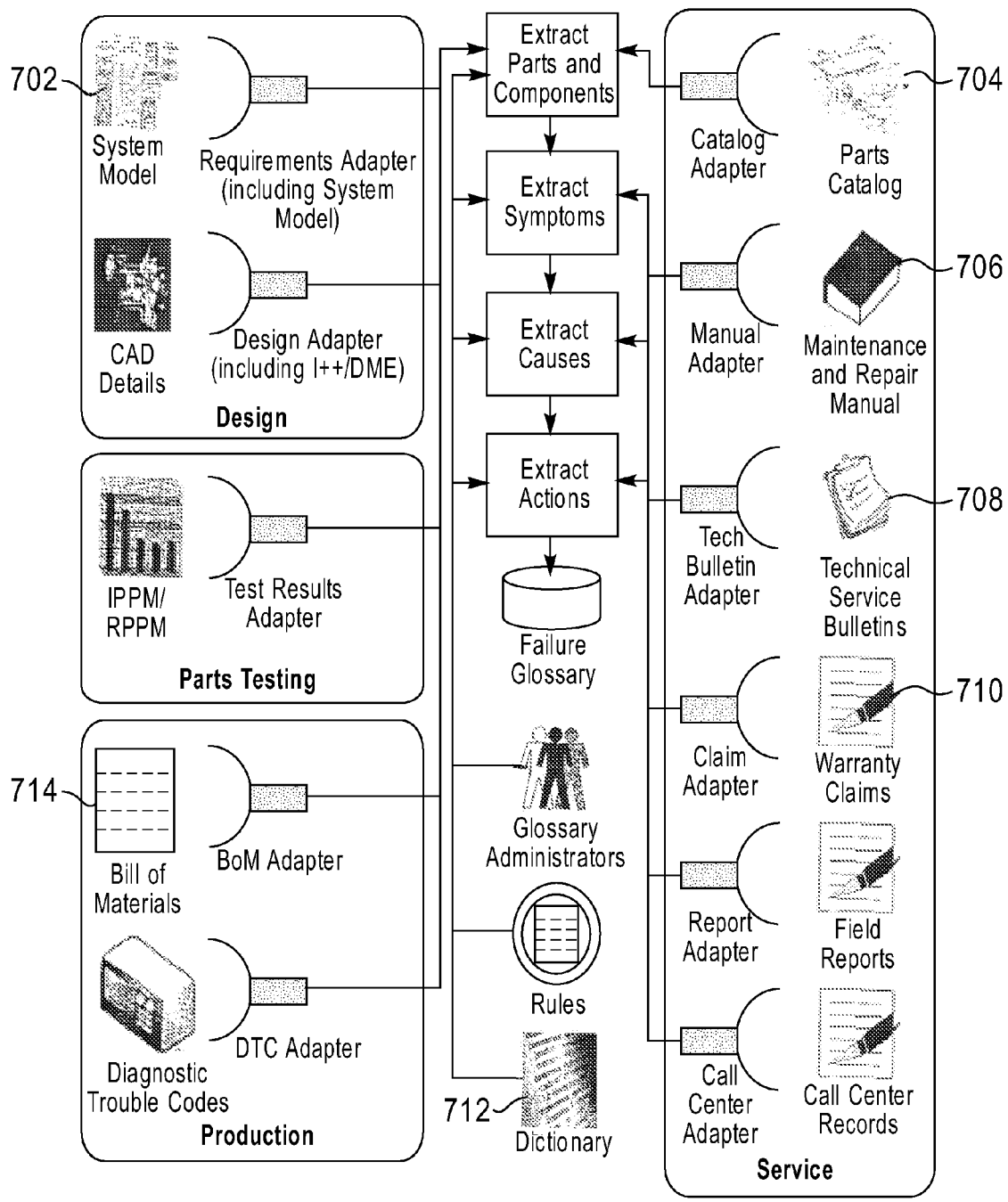
FIG. 7 is a diagram illustrating the use of adapters to extract data for automated glossary creation in accordance with an embodiment of the present invention.

FIG. 7 illustrates using existing information and adapters for automated product failure glossary creation according to an embodiment of the present invention. In this embodiment, structured sources (e.g., the SysML system model of FIG. 4), semi-structured sources (e.g., the Technical Service Bulletin of FIG. 6), and unstructured text sources (e.g., the parts catalog 704 and repair manual 706 of FIG. 7) are all used to derive glossary items.

As shown, the parts and components extraction is performed with a set of adapters (such as a system model adapter 702, a parts catalog adapter 704, a repair manual adapter 706, a technical service bulletin adapter 708, and a bill of materials adapter 714), which are each specific to a particular data source. More specifically, in this exemplary embodiment the system model adapter makes use of XML tags (e.g., through XPath) to extract a hierarchical tree of components and their products from the system model 702 (e.g., in the manner described above with reference to FIGS. 4 and 5). The tech bulletin adapter uses rules to extract symptoms, causes, and actions from the technical service bulletin 708 (e.g., in the manner described above with reference to FIG. 6). The catalog adapter uses rules to extract components and parts from the parts catalog 704 that contains formatted text in a catalog format. The manual adapter and claim adapter each use a dictionary 712 with patterns to extract symptoms, causes, and actions from its respective source. For example, the pattern <action-verb><noun-phrase> can be used for part extraction (e.g., from the phrase "replace wiper blade").

Thus, structured sources such as the system model, semi-structured sources such as Technical Service Bulletins, and unstructured text sources such as the repair manual are all used to derive glossary items. In order to use the unstructured sources in creating the glossary, syntactic analysis of each sources' unstructured text contents are performed and combined with the glossaries derived from the more structured sources.

When this information is extracted from so many sources, virtually every extracted item will have a canonical form and variants. The "canonical form" is the phrase that represents the most common way of stating a particular concept, and each "variant" is an alternate phrase for specifying the same concept. One example is the action "replace wiper blade" as a canonical form that has a variant "put on new wiper blade." The same is true for causes and symptoms that are extracted. Preferably, the variants are grouped together with the canonical form, as shown in FIG. 3. One heuristic for allowing the automatic glossary creation process to choose which of several phrases with a common meaning to use as the canonical form is to use the form with the highest occurrence count in one or more of the information sources.

Figure 8:
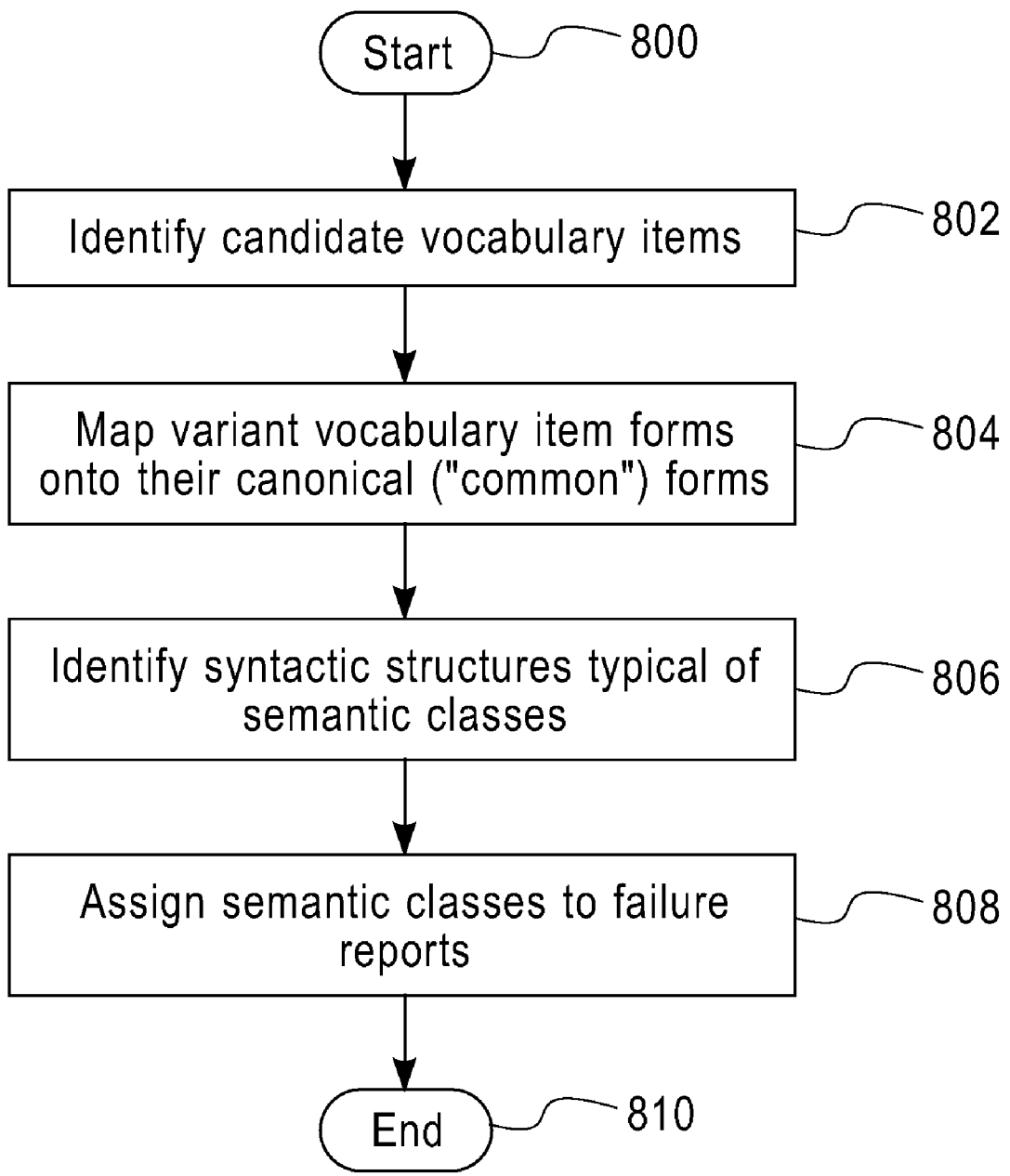
FIG. 8 is a process flow diagram of an automated glossary creation process according to one embodiment of the present invention.

A process flow diagram of an automated glossary extraction process that can arrive at a structure such as that shown in FIG. 3, is shown in FIG. 8. The process begins at step 800 and moves directly to step 802 in which candidate glossary items are identified. As stated above, this can be accomplished by using specialized resources (such as a bill of materials 714, parts catalogs 704, and other glossaries) to identify component noun phrases. Step 802 can be done automatically, using a "glossary extraction" tool. However, this step also allows for the use of "specialized resources". In this case, the resources' formats need to be manually described—for example with XPath descriptions, if appropriate. Then the extraction of the candidate glossary items based on those descriptions can be automatic.

Next, in step 804, glossary tools are used to map variant glossary item forms onto their canonical ("common") forms. Step 804 can use glossary tools of two types. First, automatic tools, such as the "glossary extraction" tool, can identify variants of the same glossary item and can select a canonical variant from among them. Such a tool handles, for example, variants that are misspellings, alternate spellings, abbreviations, acronyms, compound words, alternate phrasings, or that differ in the use of character case or special characters. A second type of tool is a "glossary administration" tool, with which a domain expert can inspect and modify candidate glossary items from any source.

In step 806, "shallow parsing" is used to identify syntactic structures typical of semantic classes. "Parsing" refers to an analysis of text that determines the structural relationships among the parts of the text. For example, in the text "replaced the exhaust manifold", the verb "replaced" takes the noun-phrase "the exhaust manifold" as its direct object. In this example, the act of parsing determines that the entire text is a "verb-phrase" containing the syntactic categories "verb" and "noun-phrase", with the relationship "direct object" linking them. "Shallow parsing" is a particular style of computerized parsing, in which the parser can quickly determine the structure of local regions in the text, but may not accurately portray the grammatical structures of full sentences. Such parsers are rule-driven and contain rules such as the following:

ACTION-<action-verb><component-NP>
    CAUSE-<observation-verb><non-component-NP>
    CAUSE-<observation-verb><clause>
    SYMPTOM-<report-verb><clause>
    SYMPTOM-<report-verb><non-component-NP>

To assist the parser, a semantic lexicon (for example, built from the glossaries developed by the present invention) contains words and phrases that are used in these syntactic structures. In the example rules above, "<action-verb>", refers to entries in the lexicon, such as "replace", which designate an action. Similarly, "<component-np>" refers to noun-phrase entries which can be a component of an automobile, such as "exhaust manifold". "<non-component-NP>" refers to a syntactic structure which is a noun phrase (as determined by the parser), but which is not listed in the lexicon as a component. Finally, the underlined portion of the rule indicates which part of the match text is to be given the semantic label that the rule assigns. For example, the first rule marks the entire verb-phrase as an ACTION.

Using the shallow parsing with the paragraph of FIG. 2, the action is located by searching the text for action verbs. In certain embodiments, the system is pre-programmed to recognize various standard abbreviations in the industry to which it applies. In this case, "RE & RE" is known to indicate "remove and replace," which are both action verbs. Once the action verb is found, a nearby component term, whether subsequent or precedent in the text, is searched for. In this case, "coolant level sensor" is the component following the action verbs. Similarly, to locate a cause, the system searches the text first for an observation verb. Examples of observation verbs are "located," "determined," "found," etc. In the example paragraph of FIG. 2, the word "found" is easily located. The system then searches around the located observation verb for a non-component word or a clause to determine what was found. In this particular example, "coolant level sensor" immediately follows the word "found." Through this process, the coolant level sensor is easily, methodically, and automatically determined to have been the cause of the problem. The same process is followed for symptom determination. A report verb is one that is likely to be used to describe a problem. In the example paragraph of FIG. 2, the term "low" can reasonably be relied on to be describing a problem. The terms "coolant light" and "engine warning light" following the report verb are components when taken on their own, but they can also be the common forms for the many ways to say the light came on. For instance, the common form "COOLANT LIGHT" can represent the phrases LOW COOLANT WARNING, WARNING FOR LOW COOLANT, as well as many other similar phrases. Examples of report verbs are "found," "noticed," "complains," and "reported." So, when "Customer noticed low coolant light warning" is seen, it is known that "noticed" is a report-verb and is followed by a noun-phrase. This noun phrase, "low coolant light warning," is the symptom. It is a variant of the common form "COOLANT LIGHT."

In step 808, semantic classes are assigned to failure reports by assigning semantic classes to the glossary items and doing lexical lookup for the text in the reports and/or using the parsing rules to assign further semantic classes to phrases and clauses in the reports. The rules leverage parts of speech in a dictionary 712 to help identify which words are likely to be parts of phrases for components and similarly for each symptom, cause, and action. The process ends at step 810.

Figure 9:
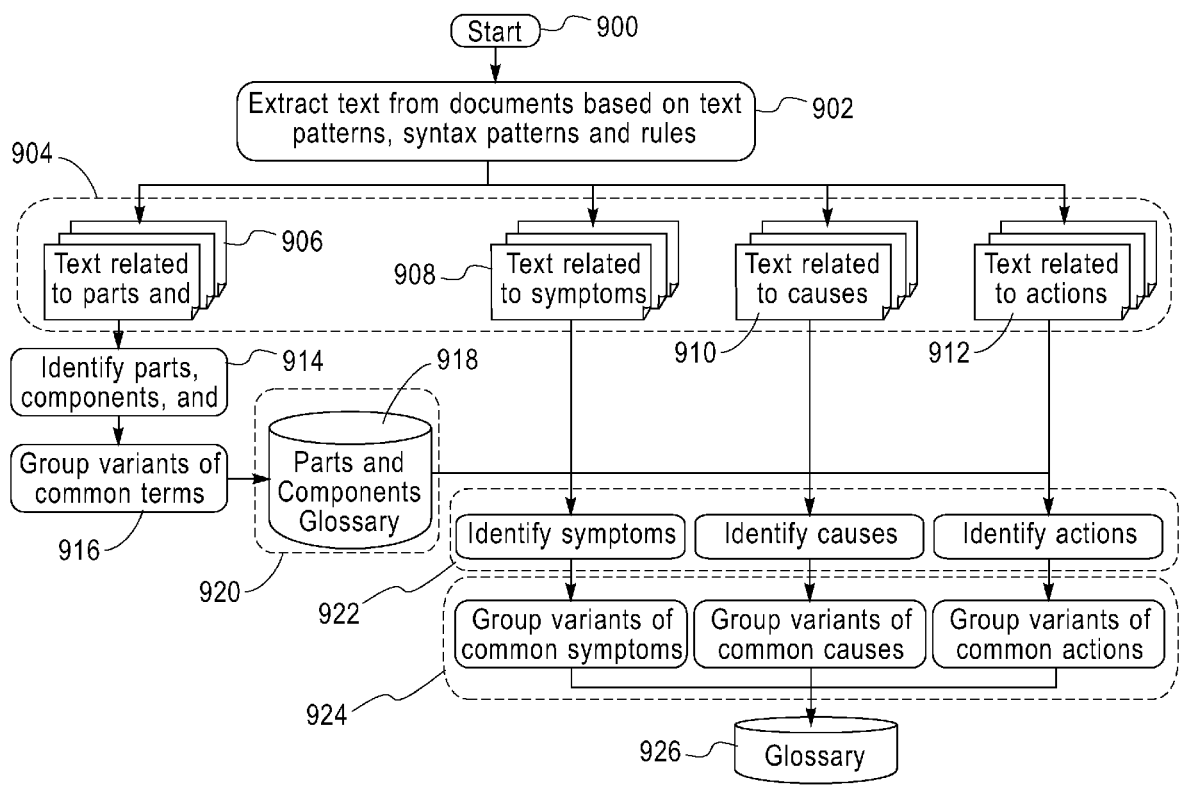
FIG. 9 illustrates automated glossary creation in accordance with an embodiment of the present invention.

A "glossary extraction" process, according to an embodiment of the present invention, shown schematically in FIG. 9, begins at step 900 and moves directly to step 902, where text is extracted from documents based on text patterns, syntax patterns, and rules. In short, the extracted text is material that is reasonably known to pertain to the subject matter the glossary is being formed to work with. In step 904, the text is segregated into groups. In one embodiment, the groups are text related to parts and components 906, text related to symptoms 908, text related to causes 910, and text related to actions 912. Because parts, components, and their relationships will be the building block of the remainder of the process, text related to parts and components is focused on first. By examining the text related to parts and components, parts, components, and their inter-relationships can be identified in step 914. It is anticipated that, for the product failure domain, the bulk of the previously-found glossary items will be nominal expressions (e.g., noun phrases) referring to product components. To these items, embodiments of the present invention can add further candidate items, by using syntactic analysis to find nominal expressions not previously known.

Based on occurrences of these candidate items in the text, on their co-occurrences with possible variant forms, on their syntactic shape (e.g., singular/plural forms), and on their occurrence statistics, automatic processes group the variants into glossary items and select the "common" variant in each item in step 916. These candidate items and variants are stored in a glossary 918 in step 920.

Then, in step 922, using these candidate items as starting points, further parsing can look for phrases and clauses which include them and which have syntactic shapes typical of symptoms, causes, and actions. For example, candidate ACTIONs can be found by looking in the text related to actions for verb phrases consisting of an action-verb followed by a component-noun-phrase (or for a passive-verb-phrase or adjectival-noun-phrase equivalent). Similarly, SYMPTOMs could be identified by parsing the text related to symptoms for configurations of a report-verb followed by either a clause or by a non-component-noun-phrase. In this case, the clause or noun-phrase would become the SYMPTOM. In certain unstructured document resources, the accuracy of such rules can be enhanced by limiting their application to sections of the documents containing the reported speech of the customer.

In one embodiment of this invention, the set of parsing rules used for this analysis will be specially built for the product domain, the available document sources, and the semantic classes (e.g., ACTION, SYMPTOM, and CAUSE) required. In addition to providing the auxiliary structured and semi-structured sources used to bootstrap the analysis with nominal expressions, the preparation will also involve creating other resources, such as the lists of action-verbs and report-verbs mentioned above.

In further processing, glossary extraction contains algorithms for determining variant forms of the new glossary items and for choosing their canonical forms and grouping variants of common causes in step 924. Once the resulting items are reviewed and stored in a glossary, or "semantic dictionary", in step 926, they can be used for subsequent analysis of product failure reports, as shown in FIG. 1. Furthermore, the same types of syntactic analysis rules that operated during glossary extraction can also be applied during analysis of product failure reports, resulting in identification of even more domain items that can be used for immediate analysis or for augmenting the glossary.

The hardware platform includes a computer system.

Generalized Architecture for a Computer System

Figure 10:
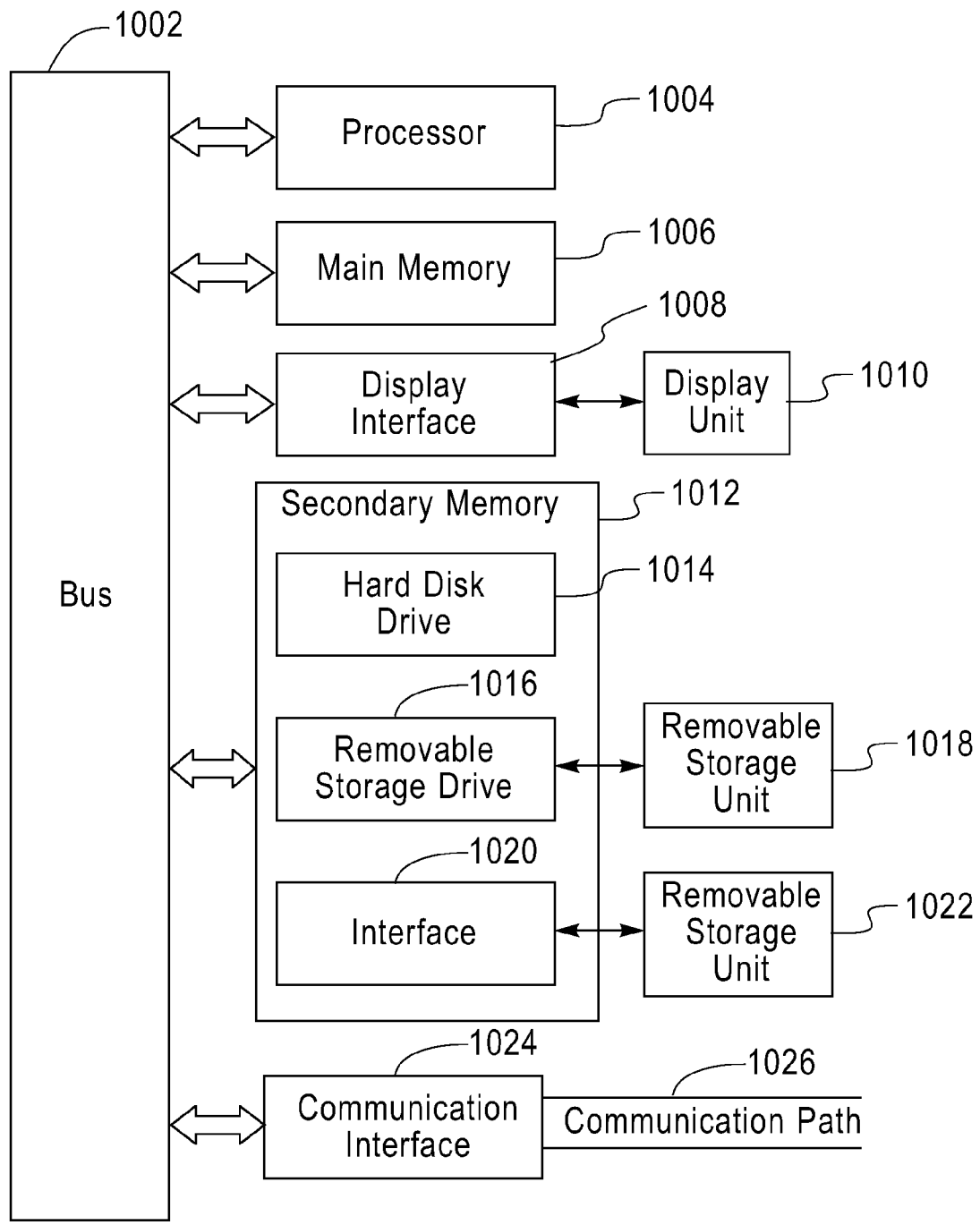
FIG. 10 is a block diagram illustrating an exemplary computer system that can be used in implementing an embodiment of the present invention.

FIG. 10 is a block diagram of a computer system useful for implementing an embodiment of the present invention. The computer system includes one or more processors, such as processor 1004. The processor 1004 is connected to a communication infrastructure 1002 (e.g., a communications bus, cross-over bar, or network). Various software embodiments are described in terms of this exemplary computer system. After reading this description, it will become apparent to a person of ordinary skill in the relevant art(s) how to implement the present invention using other computer systems and/or computer architectures.

The computer system can include a display interface 1008 that forwards graphics, text, and other data from the communication infrastructure 1002 (or from a frame buffer not shown) for display on the display unit 1010. The computer system also includes a main memory 1006, preferably random access memory (RAM), and may also include a secondary memory 1012. The secondary memory 1012 may include, for example, a hard disk drive 1014 and/or a removable storage drive 1016, representing a floppy disk drive, a magnetic tape drive, an optical disk drive, etc. Removable storage drive 1016, reads and writes to a floppy disk, magnetic tape, optical disk, etc., storing computer software and/or data. The system also includes a resource table 1018, for managing resources $R_1$-$R_n$ such as disk drives, disk arrays, tape drives, CPUs, memory, wired and wireless communication interfaces, displays and display interfaces, including all resources shown in FIG. 10, as well as others not shown.

In alternative embodiments, the secondary memory 1012 may include other similar means for allowing computer programs or other instructions to be loaded into the computer system. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computer system.

The computer system may also include a communications interface 1024. Communications interface 1024 allows software and data to be transferred between the computer system and external devices. Examples of communications interface 1024 may include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 1026. This channel 1026 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1006 and secondary memory 1012, removable storage drive 1016, a hard disk installed in hard disk drive 1014, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1006 and/or secondary memory 1012. Computer programs may also be received via communications interface 1024. Such computer programs, when executed, enable the computer system to perform the features of the present invention as discussed herein. In particular, the computer programs, when executed, enable the processor 1004 to perform the features of the computer system. Accordingly, such computer programs represent controllers of the computer system.

Although specific embodiments of the present invention have been disclosed, those having ordinary skill in the art will understand that changes can be made to the specific embodiments without departing from the spirit and scope of the present invention. The scope of the present invention is not to be restricted, therefore, to the specific embodiments. Furthermore, it is intended that the appended claims cover any and all such applications, modifications, and embodiments within the scope of the present invention.

What is claimed is:

1. A computer-implemented method for creating a glossary, the method comprising:
   identifying, in at least one information source, a plurality of glossary items, each of the glossary items identifying a part or a component;
   identifying a set of glossary items within the plurality of glossary items that comprises a common concept;
   selecting one of the glossary items in the set of glossary items as a canonical form for the set of glossary items, the canonical form being a most common way of representing the common concept;
   designating each of the other glossary items in the set of glossary items as a variant glossary item with a variant form that varies from the canonical form;
   defining, by using the canonical form, at least one syntactic structure for each of at least one semantic classes, the at least one syntactic structure including one of the plurality of glossary items; and
   searching, by a processor in at least one of the at least one information source and a second information source, for the at least one syntactic structure of the semantic class.

2. The computer-implemented method according to claim 1, further comprising:
   defining, by using at least one of the variant forms, at least one syntactic structure, that includes one of the plurality of glossary items, for each of at least one semantic classes; and
   searching, in at least one of the at least one information source and the second information source, for the at least one of the variant forms of the syntactic structure of the semantic class.

3. The computer-implemented method according to claim 1, wherein the at least one semantic class is at least one of:
   a symptom;
   a cause; and
   an action.

4. The computer-implemented method according to claim 1, further comprising:
   mapping each variant glossary item onto the canonical form.

5. The computer-implemented method according to claim 1, wherein the defining is performed by parsing to identify the at least one syntactic structure typical of a semantic class.

6. The computer-implemented method according to claim 1, further comprising:
defining, by using the canonical form, at least one syntactic structure, that does not include one of the plurality of glossary items, for each of at least one semantic classes.

7. The computer-implemented method according to claim 1, further comprising:
assigning the at least one semantic class, including the identified syntactic structure, to at least one of the plurality of glossary items.

8. The computer-implemented method according to claim 7, further comprising:
using parsing rules to assign at least one additional semantic class to at least one of a phrase and a clause in at least one of:
the at least one information source; and
the second information source.

9. The computer-implemented method according to claim 1, wherein:
at least one of the at least one information source and the second information source is a failure report.

10. The computer-implemented method according to claim 1, wherein:
the searching is a lexical lookup for text in the second source.

11. A computer-implemented method for creating a glossary, the method comprising:
extracting, from at least one information source, text related to at least one of a part and a component;
identifying a plurality of terms in the text, each of the terms being related to at least one of a part and a component;
identifying a set of terms within the plurality of terms that comprises a common concept;
determining, from the text by a processor, a canonical form for the set of terms, the canonical form being based on a most common term in the set of terms;
determining at least one variant form of the canonical form based on each of the other terms in the set of terms; and
storing the canonical form and the at least one variant form in a first glossary.

12. The computer-implemented method according to claim 11, further comprising:
extracting, from the at least one information source, text related to symptoms;
searching the text related to symptoms for at least one of the canonical form and the at least one variant form; and
identifying at least one symptom in the text related to symptoms.

13. The computer-implemented method according to claim 12, further comprising:
determining a canonical form of the symptom;
determining at least one variant form of the canonical form of the symptom; and
storing the canonical form of the symptom and the at least one variant form of the symptom in a second glossary.

14. The computer-implemented method according to claim 11, further comprising:
extracting, from the at least one information source, text related to causes;
searching the text related to causes for at least one of the canonical form and the at least one variant form; and
identifying at least one cause in the text related to causes.

15. The computer-implemented method according to claim 14, further comprising:
determining a canonical form of the cause;
determining at least one variant form of the canonical form of the cause; and
storing the canonical form of the cause and the at least one variant form of the cause in a second glossary.

16. The computer-implemented method according to claim 11, further comprising:
extracting, from the at least one information source, text related to actions;
searching the text related to actions for at least one of the canonical form and the at least one variant form; and
identifying at least one action in the text related to actions.

17. The computer-implemented method according to claim 16, further comprising:
determining a canonical form of the action;
determining at least one variant form of the canonical form of the action; and
storing the canonical form of the action and the at least one variant form of the action in a second glossary.

18. A device for creating a glossary, the device comprising:
a memory;
a processor communicatively coupled to the memory; and
a glossary creation system adapted to:
identify a plurality of glossary items in a first information source;
identify a set of glossary items within the plurality of glossary items that comprises a common concept;
select one of the glossary items in the set of glossary items as a canonical form for the set of glossary items, the canonical form being a most common way of representing the common concept;
designate each of the other glossary items in the set of glossary items as a variant glossary item with a variant form that varies from the canonical form;
define, by using the canonical form, at least one syntactic structure for each of at least one semantic classes, the at least one syntactic structure including one of the plurality of glossary items; and
searching, in at least one of the at least one information source and a second information source, for the at least one syntactic structure of the semantic class.

19. The device according to claim 18, wherein the glossary creation system is further adapted to:
define, by using at least one of the variant forms, at least one syntactic structure, that includes one of the plurality of glossary items, for each of at least one semantic classes.

20. The device according to claim 18, wherein at least one glossary item in the plurality of glossary items is at least one of a component-noun word and a component-noun phrase.

21. A non-transitory computer readable medium encoded with a program for creating a glossary, the program comprising instructions for:
identifying, in at least one information source, a plurality of glossary items, each of the glossary items identifying a part or a component;
identifying a set of glossary items within the plurality of glossary items that comprises a common concept;
selecting one of the glossary items in the set of glossary items as a canonical form for the set of glossary items, the canonical form being a most common way of representing the common concept;
designating each of the other glossary items in the set of glossary items as a variant glossary item with a variant form that varies from the canonical form;

defining, by using the canonical form, at least one syntactic structure for each of at least one semantic classes, the at least one syntactic structure including one of the plurality of glossary items; and searching, in at least one of the at least one information source and a second information source, for the at least one syntactic structure of the semantic class.

22. The non-transitory computer readable medium according to claim 21, wherein the program further comprises instructions for:

defining, by using at least one of the variant forms, at least one syntactic structure, that includes one of the plurality of glossary items, for each of at least one semantic classes; and searching, in at least one of the at least one information source and the second information source, for the at least one of the variant forms of the syntactic structure of the semantic class.

23. The non-transitory computer readable medium according to claim 21, wherein the at least one semantic class is at least one of:

a symptom;

a cause; and an action.

24. The non-transitory computer readable medium according to claim 21, wherein the program further comprises instructions for:

mapping each variant glossary item onto the canonical form.

25. The non-transitory computer readable medium according to claim 21, wherein the defining is performed by parsing to identify the at least one syntactic structure typical of a semantic class.

26. The non-transitory computer readable medium according to claim 21, wherein the program further comprises instructions for:

defining, by using the canonical form, at least one syntactic structure, that does not include one of the plurality of glossary items, for each of at least one semantic classes.

27. The non-transitory computer readable medium according to claim 21, wherein the program further comprises instructions for:

assigning the at least one semantic class, including the identified syntactic structure, to at least one of the plurality of glossary items.

28. The non-transitory computer readable medium according to claim 27, wherein the program further comprises instructions for:

using parsing rules to assign at least one additional semantic class to at least one of a phrase and a clause in the second information source.

29. The non-transitory computer readable medium according to claim 21, wherein:

at least one of the first and second information source is a failure report.

30. The non-transitory computer readable medium according to claim 29, wherein:

the searching is a lexical lookup for text in the failure report.

* * * * *